United States Patent
Maeda

(10) Patent No.: US 7,250,995 B2
(45) Date of Patent: Jul. 31, 2007

(54) LIQUID CRYSTAL DISPLAY AND ELECTRONIC DEVICE

(75) Inventor: Tsuyoshi Maeda, Yamanashi (JP)

(73) Assignee: Seiko Epson Corporation, Tokyo (JP)

( * ) Notice: Subject to any disclaimer, the term of this patent is extended or adjusted under 35 U.S.C. 154(b) by 179 days.

(21) Appl. No.: 10/826,411

(22) Filed: Apr. 19, 2004

(65) Prior Publication Data
US 2004/0239847 A1 Dec. 2, 2004

(30) Foreign Application Priority Data
May 1, 2003 (JP) ............................. 2003-126579

(51) Int. Cl.
*G02F 1/1335* (2006.01)

(52) U.S. Cl. ..................... 349/114; 349/110; 349/123; 349/138; 349/178

(58) Field of Classification Search ............... 349/114, 349/49, 50, 53, 113, 123, 110, 178, 138
See application file for complete search history.

(56) References Cited

U.S. PATENT DOCUMENTS

| | | | |
|---|---|---|---|
| 5,734,455 A | | 3/1998 | Yoshida et al. |
| 6,281,952 B1 * | | 8/2001 | Okamoto et al. ............. 349/12 |
| 6,697,138 B2 * | | 2/2004 | Ha et al. ..................... 349/114 |
| 6,717,637 B1 * | | 4/2004 | Yoon et al. .................. 349/106 |
| 6,788,375 B2 * | | 9/2004 | Ogishima et al. ........... 349/130 |
| 6,956,632 B2 * | | 10/2005 | Ozawa et al. ............... 349/114 |
| 2002/0113927 A1 | | 8/2002 | Ha et al. |
| 2003/0038904 A1 * | | 2/2003 | Kaneko et al. ............. 349/110 |
| 2004/0119924 A1 | | 6/2004 | Takeda et al. |

FOREIGN PATENT DOCUMENTS

| | | |
|---|---|---|
| CN | 1118077 A | 3/1996 |
| JP | A 11-242225 | 9/1999 |
| JP | A 11-242226 | 9/1999 |
| JP | A 2000-305099 | 11/2000 |
| JP | A-2001-215492 | 8/2001 |
| JP | A-2002-207221 | 7/2002 |
| JP | A 2003-057632 | 2/2003 |
| JP | A 2003-167253 | 6/2003 |
| JP | A-2003-167253 | 6/2003 |

OTHER PUBLICATIONS

Jisaki, Makoto et al. "Development of transfective LCD for high contrast and wide viewing angle by using homeotrophic Alignment." *Asia Display/ IDW '01* 2001, pp. 133-136.

* cited by examiner

*Primary Examiner*—Thoi V. Duong
(74) *Attorney, Agent, or Firm*—Oliff & Berridge, PLC

(57) ABSTRACT

The invention provides a liquid crystal display having uniform display and having a wide viewing angle despite the fact that the display includes active elements for switching pixels in the display area, and an electronic device including the same. Specifically, the invention is a transflective liquid crystal display, each dot of which has a reflective display area and a transmissive display area. The liquid crystal display can include an element substrate having a plurality of pixel electrodes, each pixel electrode being provided with a thin film diode (TFD) element, and an opposite substrate facing the element substrate. A reflective layer formed on the opposite substrate extends directly below the TFD element.

9 Claims, 6 Drawing Sheets

LIQUID CRYSTAL DISPLAY AND ELECTRONIC DEVICE

BACKGROUND OF THE INVENTION

1. Field of Invention

The present invention relates to a liquid crystal display and an electronic device.

2. Description of Related Art

Transflective liquid crystal displays can include a liquid crystal layer disposed between an upper substrate and a lower substrate. The inner surface of the lower substrate is provided with a reflective film formed of metal, such as aluminum. The reflective film has an opening for transmitting light and functions as a transflector. In order to improve brightness and contrast, a transflective liquid crystal display having a structure called multi-gap structure is disclosed. See, for example, Japanese Unexamined Patent Application Publication No. 11-242226. In this structure, the thickness of the liquid crystal layer is different between the reflective display area and the transmissive display area. The reflective display area corresponds to the area in which the reflective film is formed. The transmissive display area corresponds to the opening.

However, the known transflective liquid crystal device has a problem in that the viewing angle in the transmissive display mode is narrow. This is because the optical design flexibility is restricted. Since the transflector is provided on the internal surface of the liquid crystal cell in order not to produce parallax, reflective display needs to be performed with only one polarizer provided at the viewer side. In order to solve this problem, Jisaki et al. disclose a novel transflective liquid crystal display including vertically aligned liquid crystal in "Development of transflective LCD for high contrast and wide viewing angle by using homeotropic alignment", M. Jisaki et al., Asia Display/IDW'01, p. 133-136 (2001). It has the following characteristics:

(1) A "VA (vertical alignment) mode" is adopted. In the VA mode, molecules of liquid crystal with negative dielectric anisotropy are aligned vertically with respect to the substrate, and then tilted by an applied voltage.

(2) A "multi-gap structure" is adopted. In the multi-gap structure, the thickness of the liquid crystal layer (cell gap) is different between the transmissive display area and the reflective display area (see, for example, Patent Document 1).

(3) An "alignment division structure" is adopted. The transmissive display area is a regular octagon in shape. A projection is provided in the center of the transmissive display area on the opposite substrate so that the liquid crystal molecules are tilted in eight directions in the transmissive display area.

SUMMARY OF THE INVENTION

According to the above article by Jisaki et al., the direction in which the liquid crystal molecules tilt in the transmissive display area is controlled by a projection. However, how to control the direction in which the liquid crystal molecules tilt in the reflective display area is not mentioned at all. If the liquid crystal molecules tilt in random directions, a discontinuous line called disclination appears at the border between different liquid crystal alignment areas and causes, for example, an afterimage. In addition, since alignment areas of the liquid crystal have different vision properties, non-uniformity will disadvantageously be visible when viewed from an angle.

Moreover, in an active-matrix liquid crystal display, an electric field is produced in the position and vicinity of the switching element by switching of the element. This electric field may cause alignment disorder of the liquid crystal and reduce contrast. However, the above article does not contain a description concerning the area in which the switching element is formed. It is not considered at all.

It is an object of the invention to provide a liquid crystal display providing uniform display and having a wide viewing angle despite the fact that it includes active elements for switching pixels in the display area, and an electronic device including the same.

The invention is a transflective liquid crystal display, each dot of which has a reflective display area and a transmissive display area. The liquid crystal display can include an element substrate having a plurality of pixel electrodes, each pixel electrode being provided with a switching element, an opposite substrate facing the element substrate; and a liquid crystal layer disposed between the two substrates. A reflective layer is provided in the reflective display area of the opposite substrate, and the reflecting layer extends directly below the switching element.

If alignment disorder of the liquid crystal molecules is caused by an electric field produced in the vicinity of the switching element when the switching element operates, the change of optical property caused by this alignment disorder is not visible to the viewer. Therefore, display defects caused by the alignment disorder are substantially eliminated, and display quality is thereby improved. This is because, in a liquid crystal display having this structure, the reflective layer extends directly below the switching element. The light outputted from the vicinity of the switching element passes through the liquid crystal layer twice. In other words, if the optical property of the light incident on the liquid crystal layer changes due to alignment disorder of the liquid crystal molecules, the change of the optical property is compensated when the light passes through the liquid crystal layer after it is reflected by the reflective layer.

In the liquid crystal display having this structure, since display defects due to the alignment disorder are substantially eliminated, a black matrix or a light shielding film covering the switching element is unnecessary. The aperture ratio of the liquid crystal display is thereby improved and a bright display is achieved.

In the liquid crystal display according to the invention, the liquid crystal layer may include liquid crystal with negative dielectric anisotropy. In other words, the liquid crystal display according to the invention may be a liquid crystal display of vertical-alignment mode. By this structure, a high-contrast display with a wide viewing angle is achieved. In addition, a bright display with a high aperture ratio is achieved.

The liquid crystal display according to the invention may further include electrode layers provided on both sides of the liquid crystal layer, and an alignment controlling device provided in the electrode layers. By this structure, the direction in which the vertically aligned liquid crystal molecules tilt when the voltage is applied is controlled appropriately, and non-uniformity when viewed from an angle is prevented effectively. This non-uniformity is acknowledged as a problem in display quality for the liquid crystal display of vertical alignment mode. Thus, a high definition display can be provided.

The liquid crystal display according to the invention preferably further can include a circularly polarized light inputting device that inputs circularly polarized light to the element substrate and the opposite substrate. By this structure, the quality of reflective display and transmissive display is further improved. If circularly polarized light is used, it is not necessary to determine the direction in which the liquid crystal molecules tilt when the voltage is applied. Regardless of the direction, if the liquid crystal molecules tilt by the voltage, a bright display is achieved.

In the liquid crystal display according to the present invention, the switching element may be a nonlinear diode element. A TFD (thin film diode) element needs comparatively high voltage for switching, therefore intense electric field is produced in the vicinity of the element. However, according to the invention, if the TFD element is used as a switching element, display defects caused by the alignment disorder of the liquid crystal molecules due to the above electric field are substantially eliminated. Therefore, a bright liquid crystal display with a high aperture ratio is provided. Since the TFD element needs only a single metal wiring as compared to other elements such as a TFT element, a bright display with a high aperture ratio is achieved.

Next, an electronic device according to the present invention includes the liquid crystal display according to the present invention described above. In this way, an electronic device having a bright and high-quality display is provided.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Embodiments of the invention will now be described with reference to the drawings.

Figure 1:
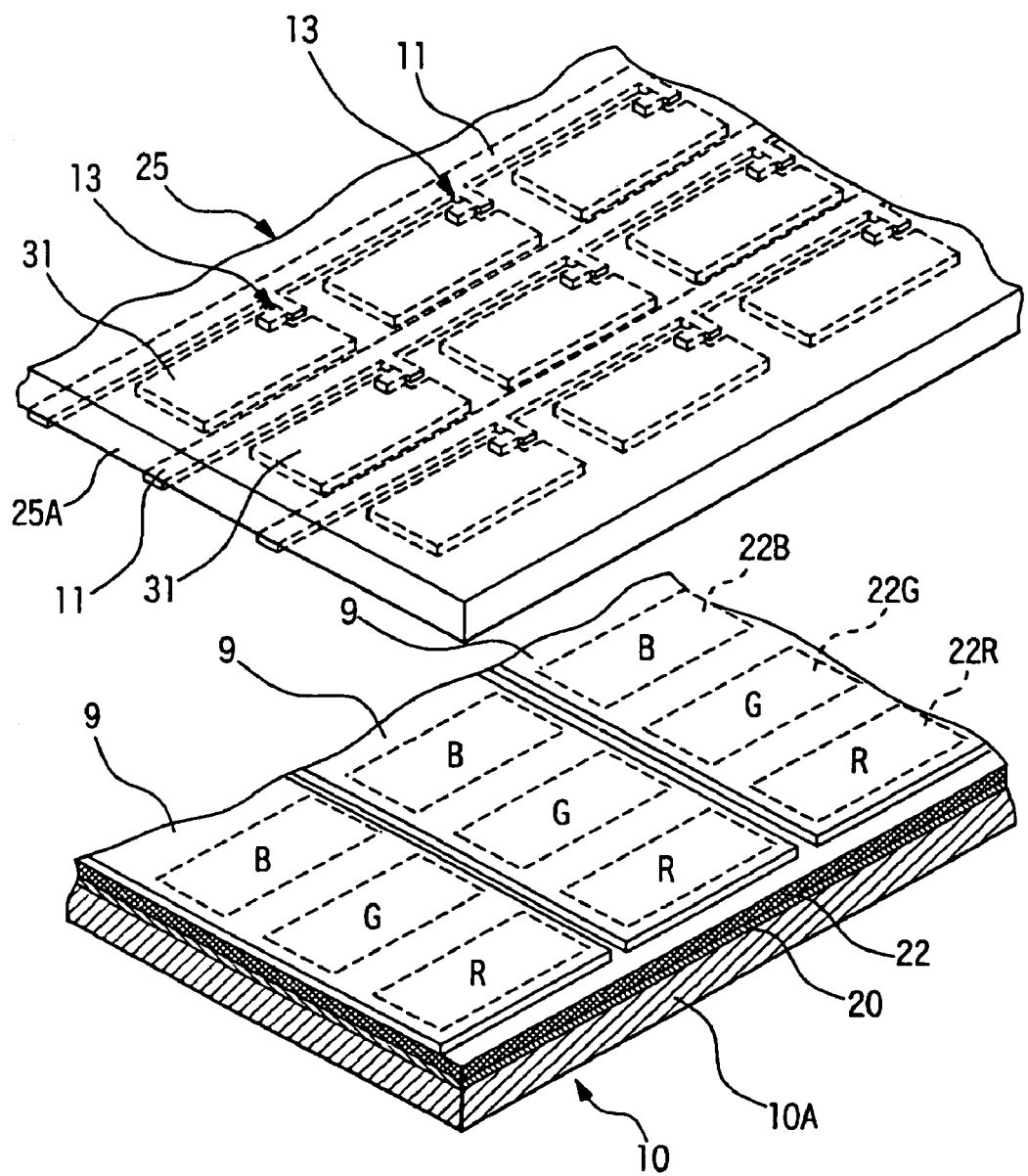
FIG. 1 is a perspective view partly showing an example, liquid crystal display of a first embodiment.
Figure 2:
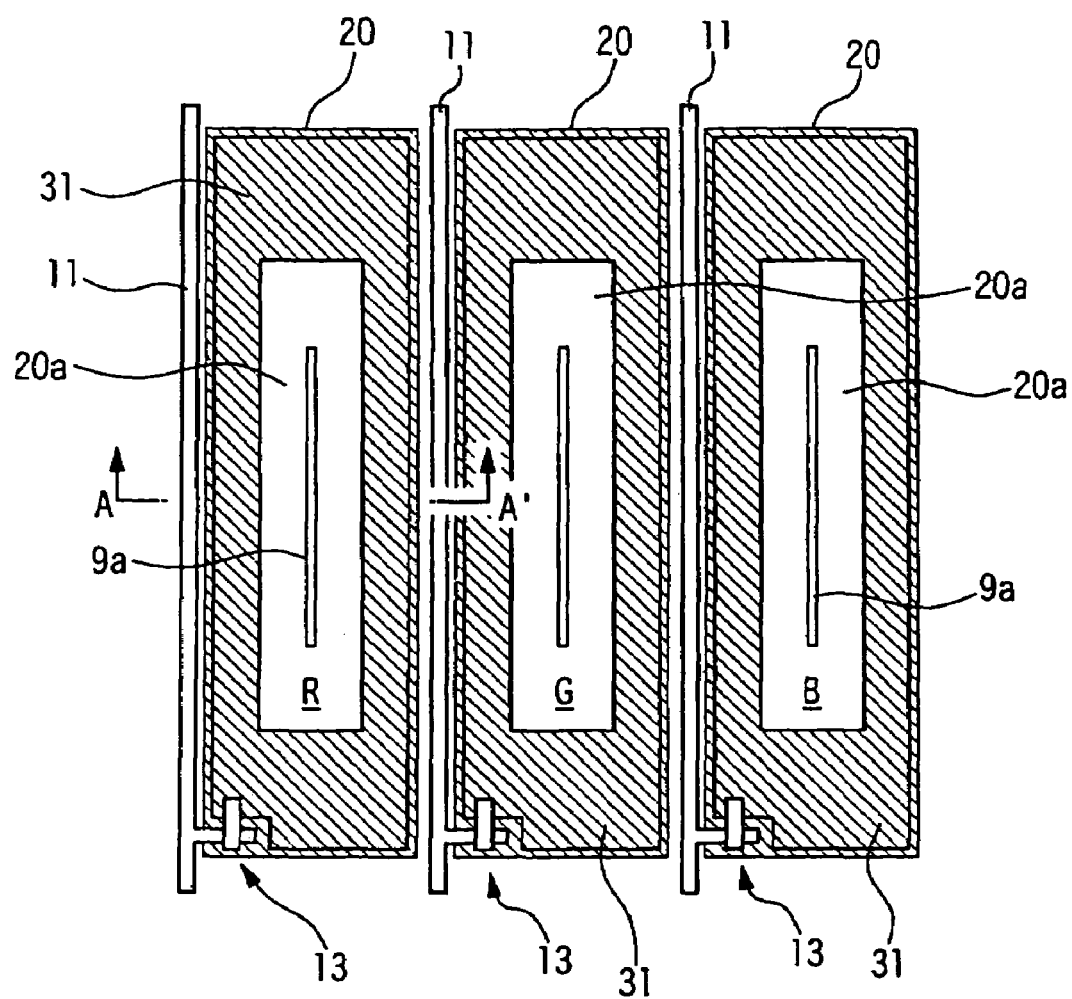
FIG. 2 is a plan view showing an exemplary structure of one pixel area.
Figure 3:
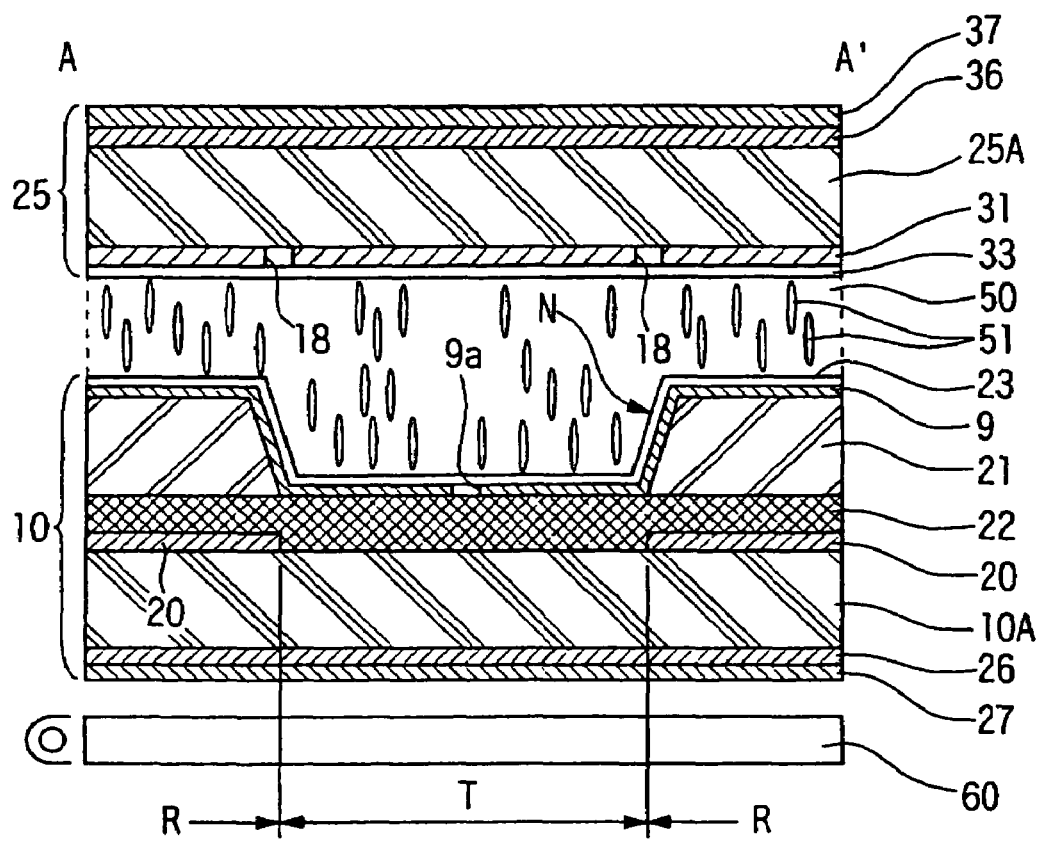
FIG. 3 is a sectional view taken along line A-A' of FIG. 2.

FIG. 1 is a perspective view showing a display area of a liquid crystal display of the first embodiment of the invention. FIG. 2 is a plan view showing the structure of one pixel area. FIG. 3 is a sectional view taken along line A-A' of FIG. 2. The liquid crystal display shown in these figures is an active-matrix color liquid crystal display including TFD (thin film diode) elements (nonlinear diode elements) functioning as switching elements. As shown schematically in FIG. 3, the liquid crystal layer of this embodiment is formed of liquid crystal with negative dielectric anisotropy and the initial alignment state of molecules of the liquid crystal is vertical.

As shown in FIG. 1, the liquid crystal display of this embodiment is composed mainly of an element substrate 25 and an opposite substrate 10 facing each other. A liquid crystal layer (not shown) is disposed between the substrates 10 and 25. The element substrate 25 has a substrate body 25A formed of transparent material, such as glass, plastic, and quartz. On the inner side (the underside in the figure) of the substrate body 25A, a plurality of data lines 11 are provided in stripes. In addition, a plurality of substantially rectangular pixel electrodes 31 are arranged in a matrix. The pixel electrodes 31 are formed of transparent conductive material such as ITO (indium tin oxide) and are each provided with a TFD element 13. The TFD elements 13 connect the pixel electrodes 31 with the data lines 11.

On the other hand, the opposite substrate 10 has a substrate body 10A formed of transparent material, such as glass, plastic, and quartz. On the inner side (the upper side in the figure) of the substrate body 10A, a reflective layer 20, a color filter layer 22, and a plurality of scanning lines 9 are formed. The reflective layer 20 is a thin film of metal, such as aluminum and silver. The scanning lines 9 are formed of transparent conductive material such as ITO and extend in the direction crossing the data lines 11 on the element substrate 25. The color filter layer 22 is composed of substantial rectangular color filters 22R, 22G, and 22B arranged periodically, as shown in FIG. 1. The scanning line 9 is formed so as to cover the color filters 22R, 22G; and 22B arranged in the extending direction of the scanning line 9.

FIG. 2 is a plan view showing the structure of one pixel area of the liquid crystal display shown in FIG. 1. FIG. 2 shows the structure when viewed from the outer side of the element substrate 25 in FIG. 1.

As shown in FIG. 2, in the liquid crystal display of this embodiment, one pixel consists of three R, G, and B dots. Each dot area is provided with a rectangular frame-like reflective layer 20 having an opening area 20a. the pixel electrodes 31 are disposed in substantially the same positions as the refelective layers 20 when viewed from above. A corner of the pixel electrode 31 is cut off and a TFD element is formed there. The area in which the TFD element 13 is formed is located directly above the area in which the reflective layer 20 is formed.

Next, refer to the cross-sectional structure shown in FIG. 3. The liquid crystal layer 50 is disposed between the opposite substrate 10 and the element substrate 25. As shown schematically by liquid crystal molecules 51, the liquid crystal layer 50 is formed of liquid crystal with negative dielectric anisotropy and the initial alignment of the liquid crystal molecules is vertical.

On the substrate body 10A of the opposite substrate 10, a reflective layer 20 is formed partly. The area of the reflective layer 20 corresponds to the reflective display area R according to this embodiment. The area which is not provided with the reflective layer 20 corresponds to the transmissive display area T. On the reflective layer 20 and on the substrate body 10A in the transmissive display area T, a color filter layer 22 is provided. In this color filter layer 22, color filters 22R, 22G, and 22B are disposed in every three adjacent dot areas. The color filters 22R, 22G, and 22B have different colors, that is to say, red (R), green (G), and blue (B), respectively. In order to compensate for differences in chromaticity between reflective display and transmissive display, a pigment layer whose color saturation is different between the reflective display area and the transmissive display area may be provided.

An insulating film 21 is formed on the color filter layer 22 in the position which corresponds substantially to the reflective display area R. The insulating film 21 is formed of an organic film, such as acrylic resin, which has a thickness of about 2 $\mu m \pm 1$ $\mu m$. In the vicinity of the border between the reflective display area R and the transmissive display area T, the insulating film 21 has a slope area N so as to vary continuously in thickness. Since the liquid crystal layer 50 in the portion where the insulating film 21 does not exist has a thickness of about 2 to 6 $\mu m$, the thickness of the liquid crystal layer 50 in the reflective display area R is nearly half of the thickness of the liquid crystal layer 50 in the transmissive display area T. The insulating film 21 functions as an adjusting layer. That is to say, the thickness of the insulating film 21 makes the thickness of the liquid crystal layer 50 different between the reflective display area R and the transmissive display area T. A multi-gap structure is thus realized. By this structure, the liquid crystal display of this embodiment can provide bright and high-contrast display.

In this embodiment, the edge of the bottom portion of the insulating film 21 substantially corresponds to the edge of the reflective film 20 (reflective display area). Therefore, the slope areas N are substantially included in the reflective display area R. Thus, the area in which the liquid crystal alignment is disordered due to non-uniformity of the liquid crystal layer thickness in the slope area N is disposed outside the transmissive display area T, and thereby superior transmissive display is achieved.

An electrode 9 is formed on the surface of the opposite substrate 10 including the surface of the insulating film 21. The electrode 9 can be formed of transparent conductive film, such as ITO (indium tin oxide). An alignment film 23. is formed on the electrode 9. The alignment film 23 is formed of, for example, polyimide. As shown in FIG. 2, the slit 9a is formed and extends vertically in the middle of the transmissive display area T. The slit 9a is formed in the electrode 9 on the opposite substrate 10 as shown in FIG. 3.

As for the element substrate 25, a pixel electrode 31 is formed on the substrate body 25A. An alignment film 33 is formed on the pixel electrode 31. The pixel electrode 31 is formed of a transparent conductive material such as ITO. The alignment film 33 is formed of, for example, polyimide. Both alignment films 23 and 33 on the opposite substrate 10 and the element substrate 25 are processed for vertical alignment. However, a pre-tilting process, such as rubbing, is not performed.

As shown in FIG. 3, the pixel electrode 31 has openings in the dot area. In the plan view of FIG. 2, these openings 18 are formed in substantially the same positions as the vertical sides of the opening area 20a of the rectangular frame-like reflective layer 20. These openings 18 and the slit 9a function as an alignment controlling device that controls the direction in which the vertically aligned liquid crystal molecules forming the liquid crystal layer 50 tilt when the voltage is changed.

On the outer side of the opposite substrate 10, a retardation film 26 is provided on the substrate body, and a polarizer 27 is provided on the retardation film 26. On the outer side of the element substrate 25, a retardation film 36, is provided on the substrate body, and a polarizer 37 is provided on the retardation film 36. The retardation films 26 and 36 have a phase difference of about ¼ wavelength with respect to the wavelength of the visible light. By combinations of the retardation films and the polarizers, circularly polarized light is incident on the liquid crystal layer from both the opposite substrate 10 side and the element substrate 25 side, and linearly polarized light is output. In the outside of the liquid crystal cell corresponding to the outer side of the opposite substrate 10, a backlight 60 is provided. The backlight 60 has a light source, a reflector, and a light guide substrate.

In the liquid crystal display of this embodiment having the above structure, as shown in FIG. 2, the TFD element 13 on the element substrate 25 is located directly above the reflective layer 20 on the opposite substrate 10. The TFD element 13 needs comparatively high voltage for switching. If alignment disorder of the liquid crystal molecules 51 in the vicinity of the TFD element 13 is caused by an electric field, display defects caused by this alignment disorder are not visible to the viewer, and thereby superior display is achieved. The reason is as follows:

In the reflective display area, the light reaching the viewer passes through the liquid crystal layer 50 twice, that is to say, the light is incident on the liquid crystal layer 50 from the element substrate 25 side, reflected by the reflective layer 20, and output to the outer side of the element substrate 25. If the optical property changes due to alignment disorder of the liquid crystal molecules 51 forming the liquid crystal layer 50, the change of optical property is compensated when the light is reflected by the reflective layer 20 and passes through the liquid crystal layer 50 again.

It is difficult to control the alignment disorder of liquid crystal caused by an intense electric field in the vicinity of the TFD element 13 by the alignment controlling device, such as an alignment film. Therefore, in the transmissive liquid crystal display including TFD elements, the area in which the TFD element 13 is formed is covered with a black matrix or a light shielding film. In the liquid crystal display of this embodiment, however, for the reasons described above, display defects in the vicinity of the TFD element 13 are substantially eliminated. Therefore, a black matrix or a light shielding film covering the TFD element 13 is unnecessary. Hence, the vicinity of the TFD element 13 can be used as a display area, and the aperture ratio of the liquid crystal display is thereby improved and bright display is achieved.

In addition, in the liquid crystal display of this embodiment, the direction in which the vertically aligned liquid crystal molecules 51 tilt when the voltage is applied is controlled appropriately by a slit 9a formed in the scanning line 9 and by openings 18, 18 formed in the pixel electrode 31, as shown in FIG. 3.

Figure 4A:
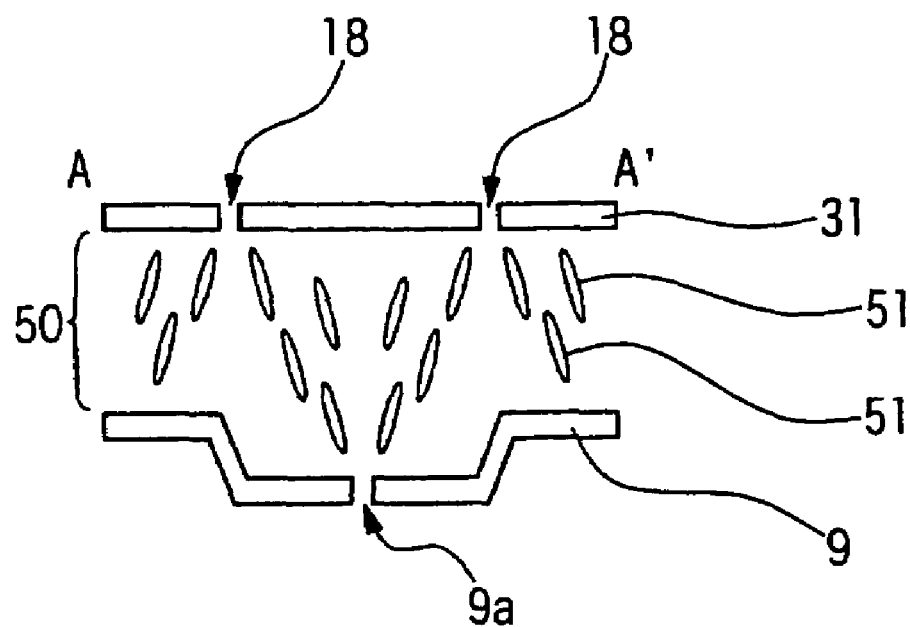
FIG. 4 (a) and FIG. 4 (b) are illustrations of alignment controlling means according to the embodiment.
Figure 4B:
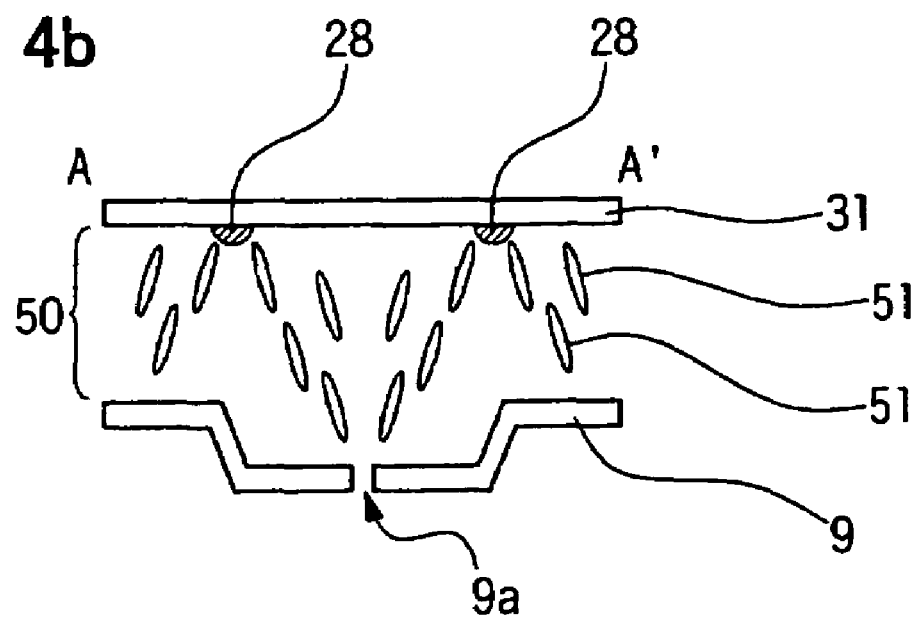

FIG. 4 (a) is a schematic sectional view illustrating the alignment restriction by the slit 9a and the openings 18. As shown in FIG. 4 (a), in the liquid crystal display of this embodiment, when the voltage changes, the liquid crystal molecules 51 tilt toward both sides (across the width) of the openings 18 and the slit 9a. The openings 18 and the slit 9a extend substantially perpendicular to the drawing. Therefore, the domain border of the liquid crystal is fixed, and non-uniformity when viewed from an angle is prevented effectively. This non-uniformity is acknowledged as a problem in display quality for the liquid crystal display including a vertically aligned liquid crystal layer. Thus, a superior display with wide viewing angle range is achieved.

As shown in FIG. 4 (b), ridges 28 extending substantially perpendicular to the drawing may be used as alignment controlling means. These ridges 28 can also control the tilting direction of the liquid crystal molecules 51 favorably, thereby achieving a superior display with a wide viewing angle range.

In addition, in this embodiment, the openings 18 and the sloping areas N are formed in the same positions when viewed from above. By this structure, the portion in which the display defects are caused due to non-uniformity of the liquid crystal layer thickness in the slope area N can be located in the same position as the domain border of the liquid crystal formed under the openings 18. Thus, the aperture ratio of the liquid crystal display is improved and bright display is achieved.

As described above, the display contrast is improved by adopting a multi-gap structure. In addition, the viewing angle is widened by providing the slit 9a and the openings 18 for controlling the vertical-alignment liquid crystal. Moreover, the display quality and the aperture ratio are improved by controlling display defects caused by alignment disorder of the liquid crystal molecules 51 in the vicinity of the TFD element 13. Hence, the liquid crystal display of this embodiment is bright and has high-contrast and a wide viewing angle.

Figure 5:
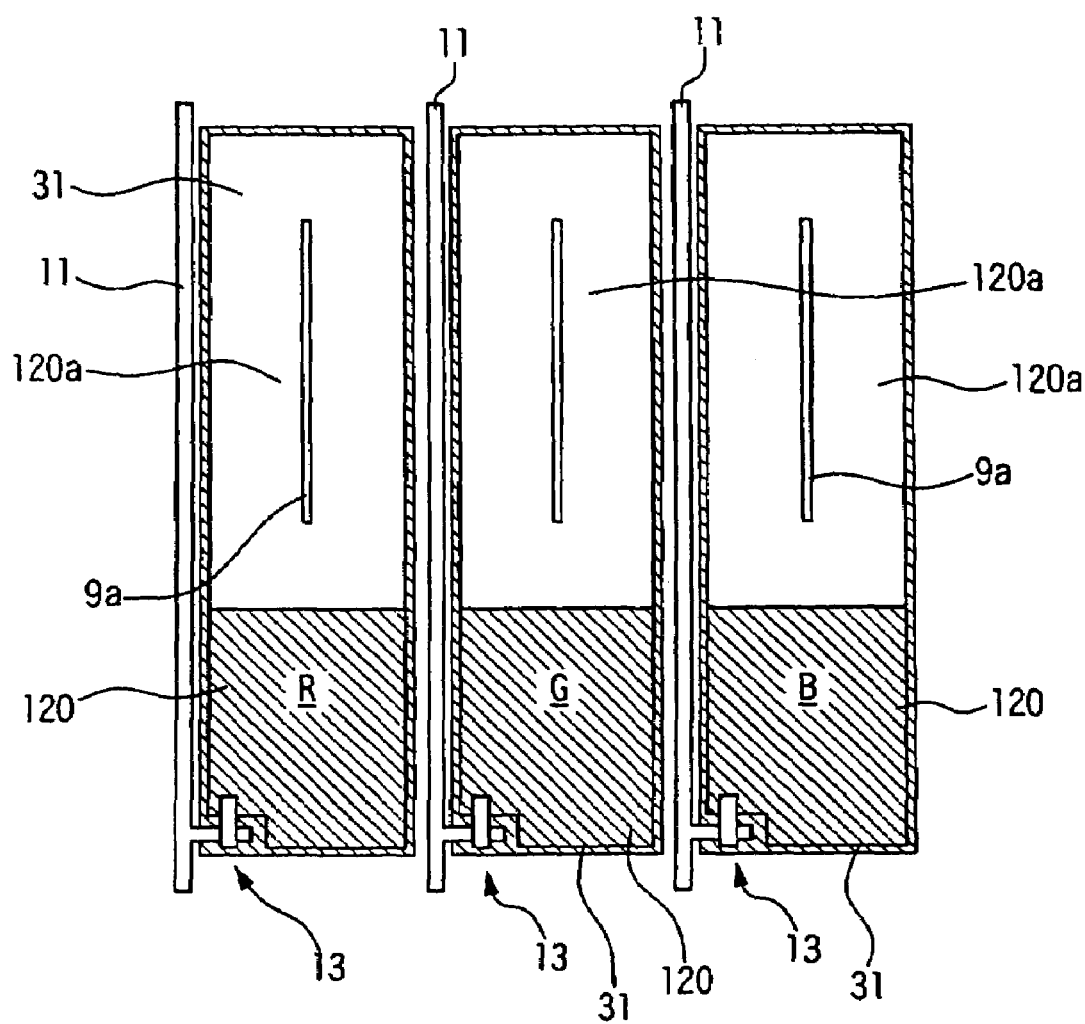
FIG. 5 is a plan view showing the structure of one pixel area according to a second embodiment.

Next, a second embodiment of the invention will be described with reference to FIG. 5. FIG. 5 is a plan view showing the structure of one pixel area of the liquid crystal display of this embodiment. The liquid crystal display of this embodiment has basically the same structure as the liquid crystal display of the first embodiment; however, the planar shape of the reflective layer 120 is different from the reflective layer 20 shown in FIG. 2. In other words, although the opening area 20a of the reflective layer 20 is formed substantially in the middle of the dot area in the first embodiment, the opening area 120a forming a transmissive display area has substantially the same width as the pixel electrode 31 on the element substrate 25.

In the liquid crystal display of this embodiment having the above structure, the display defects caused by an electric field formed when the TFD element 13 switches are substantially eliminated by disposing the TFD element 13 directly above the reflective layer 120. Thus, the aperture ratio of the liquid crystal display can be improved and a bright display can be achieved.

In the first embodiment and second embodiment, the liquid crystal display includes TFD elements functioning as switching elements. However, it should be understood that the invention can be applied to a liquid crystal display, including TFT (thin film transistor) elements functioning as switching elements, and the same advantageous effect as above can be achieved.

In addition, although the liquid crystal layer 50 is formed of liquid crystal of vertical alignment, the liquid crystal layer 50 may be formed of liquid crystal of parallel alignment or twist alignment.

Figure 6:
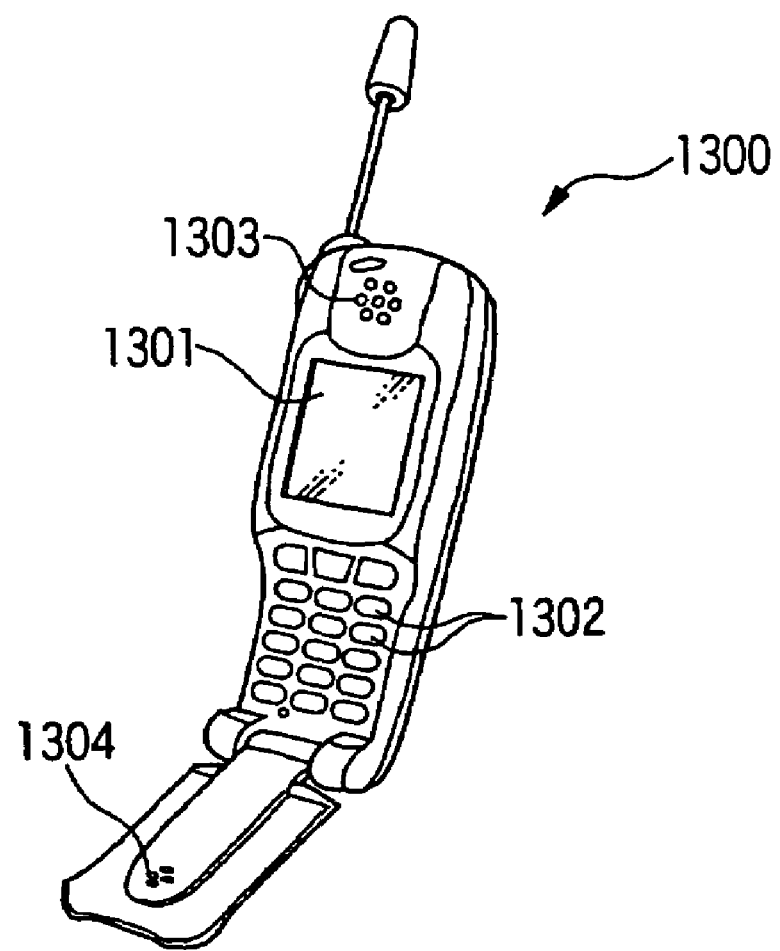
FIG. 6 is a perspective view showing an example of electronic device.

FIG. 6 is a perspective view showing an example of an electronic device according to the invention. A mobile phone 1300 has a display of the present invention as a small-size display 1301, in addition to a plurality of keys 1302, an earpiece 1303, and a mouthpiece 1304.

The displays of the above embodiments can be used as and are suitable for a display not only for a mobile phone, but also for an electronic book reader, a personal computer, a digital still camera, a liquid crystal TV, a camcorder with an eyepiece-type viewfinder or a monitor-type viewfinder, a car navigation system, a pager, an electronic organizer, a calculator, a word processor, a workstation, a TV telephone, a point-of-sale terminal, a device with a touch panel, and the like. In any electronic device, bright, high-contrast, and wide viewing angle display can be possible.

While this invention has been described in conjunction with the specific embodiments thereof, it is evident that many alternatives, modifications and variations will be apparent to those skilled in the art. Accordingly, preferred embodiments of the invention as set forth herein are intended to be illustrative, not limiting. There are changes that may be made without department from the spirit and scope of the invention.

What is claimed is:

1. A transflective liquid crystal display including a plurality of dots, each dot having a reflective display area and a transmissive display area, the reflective display area and the transmissive display area of each dot being separate and independent from each other, the transflective liquid crystal display comprising:
   an element substrate having a pixel electrode;
   an opposite substrate facing the element substrate; the opposite substrate including an opposing electrode opposing the pixel electrode;
   a liquid crystal layer disposed between the pixel electrode and the opposing electrode of the two substrates, the liquid crystal layer including liquid crystal with a negative dielectric anisotropy;
   a switching element connected to the pixel electrode, the switching element generating an electric field that causes an alignment disorder of liquid crystal molecules in the liquid crystal layer;
   an adjusting layer provided at least in the reflective display area, the adjusting layer making a thickness of the liquid crystal layer thicker in the transmissive display area than in the reflective display area, the adjusting layer including a slope in a vicinity of a boundary between the transmissive display area and the reflective display area;
   a reflective layer provided in the reflective display area of the opposite substrate and in a non-overlapping condition with the transmissive display area in plan view, the reflective layer having a portion extending directly below the switching element, beneath the slope of the adjusting layer, and to an edge of the slope of the adjusting layer that borders the transmissive display area, the portion shielding the alignment disorder of the liquid crystal layer from being viewed during transmissive display; and
   at least one of a slit, opening, and ridge that control the direction in which the liquid crystal molecules of the liquid crystal layer tilt, the at least one of a slit, opening, and ridge being provided in overlap in plan view with both the slope of the adjusting layer and the edge of the reflective layer.

2. The liquid crystal display according to claim 1, further comprising a circularly polarized light inputting device that inputs circularly polarized light to the element substrate and the opposite substrate.

3. The liquid crystal display according to claim 1, the switching element being a nonlinear diode element.

4. An electronic device including the liquid crystal display according to claim 1.

5. The transflective liquid crystal display according to claim 1, wherein
   the at least one of a slit, opening, and ridge does not extend beyond, in plan view, either edge of the slope of the adjusting layer.

6. A transflective liquid crystal display including a plurality of dots, each dot having a reflective display area and a transmissive display area, the reflective display area and the transmissive display area of each dot being separate and independent from each other, the transflective liquid crystal display comprising:
   an element substrate having a pixel electrode;
   an opposite substrate facing the element substrate, the opposite substrate including an opposing electrode opposing the pixel electrode;
   a liquid crystal layer disposed between the pixel electrode and the opposing electrode of the two substrates, the liquid crystal layer including liquid crystal with a negative dielectric anisotropy;
   a switching element connected to the pixel electrode, the switching element generating an electric field that causes an alignment disorder of liquid crystal molecules in the liquid crystal layer;
   an adjusting layer provided at least in the reflective display area, the adjusting layer making a thickness of the liquid crystal layer thicker in the transmissive display area than in the reflective display area, the adjusting layer including a slope in a vicinity of a boundary between the transmissive display area and the reflective display area;

a reflective layer provided in the reflective display area of the opposite substrate and in a non-overlapping condition with the transmissive display area in plan view, the reflective layer having a portion extending directly below the switching element, beneath the slope of the adjusting layer, and to an edge of the slope of the adjusting layer that borders the transmissive display area, the portion shielding the alignment disorder of the liquid crystal layer from being viewed during transmissive display; and at least one of a slit, opening, and ridge that control the direction in which the liquid crystal molecules of the liquid crystal layer tilt, the at least one of a slit, opening, and ridge being provided such that substantially all of the at least one of a slit, opening, and ridge is within the boundaries, in plan view, of the slope of the adjusting layer.

7. The transflective liquid crystal display according to claim 6, further comprising a circularly polarized light inputting device that inputs circularly polarized light to the element substrate and the opposite substrate.

8. The transflective liquid crystal display according to claim 6, the switching element being a nonlinear diode element.

9. An electronic device including the transflective liquid crystal display according to claim 6.

* * * * *